C. DANIEL.
FISHING TOOL.
APPLICATION FILED MAY 19, 1910.
1,016,816.
Patented Feb. 6, 1912.
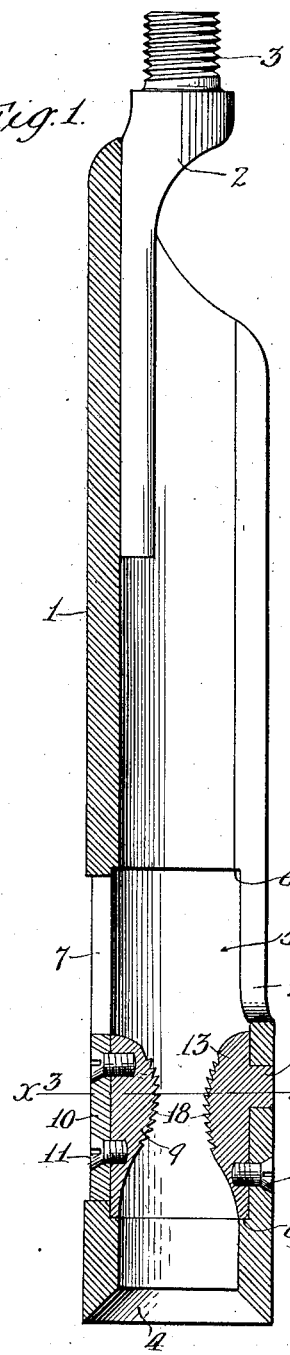
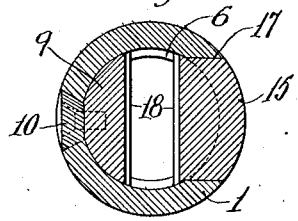
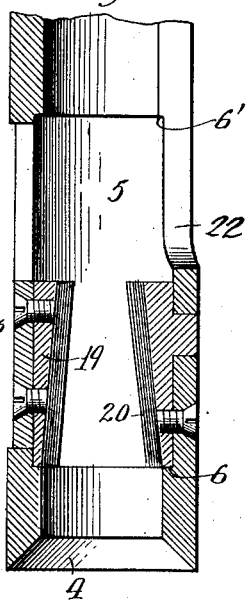
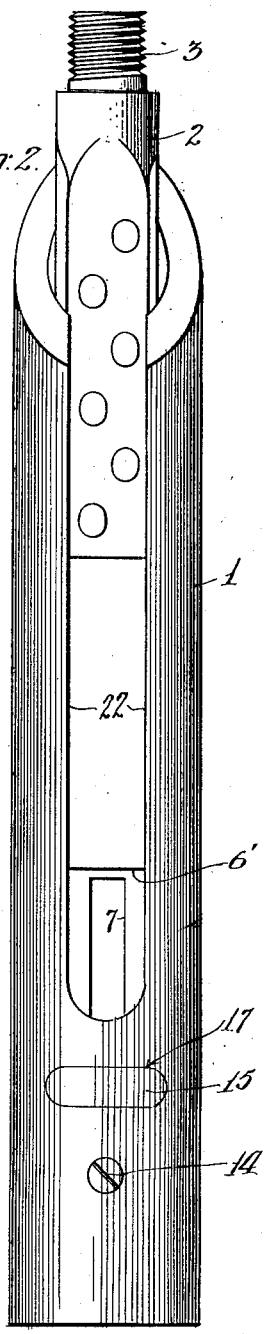
Witnesses:—
Louis W. Gratz.
Lester H. Fulmer.
Inventor:
Charles Daniel
By Townsend Lyon & Hackley
His Attys

UNITED STATES PATENT OFFICE.

CHARLES DANIEL, OF LOS ANGELES, CALIFORNIA.

FISHING-TOOL.

1,016,816. Specification of Letters Patent. Patented Feb. 6, 1912.

Application filed May 19, 1910. Serial No. 562,314.

*To all whom it may concern:*

Be it known that I, CHARLES DANIEL, a citizen of the United States, residing at Los Angeles, in the county of Los Angeles and State of California, have invented a new and useful Fishing-Tool, of which the following is a specification.

This invention relates to fishing tools for recovering from the bottom of a well a drilling or other tool which may have lodged therein, and the main object of the invention is to simplify the construction of such fishing tool.

Another object of the invention is to provide a fishing tool wherein different shapes of jaws may be used in one and the same tool.

A further object of the invention is to reduce the number of sets of slips required in such tool.

Another object of the invention is to provide a fishing tool which will release easily the part which has been raised.

Another object of the invention is to provide a fishing tool with jaws held in such manner as to provide maximum pulling power without danger of breakage.

A further object of the invention is to dispense with the use of springs in a fishing tool.

Other objects of the invention will appear hereinafter.

The invention comprises, in combination with a supporting member, a jaw held firmly in fixed position thereon, and a movable slip or jaw supported on said supporting member in such manner as to be vertically movable, the said jaws being so shaped that such vertical movement of the slip provides for engagement of the jaws around and over the part to be fished, and in the reverse movement provides for gripping such part.

The accompanying drawings illustrate the invention, and referring thereto:—

Figure 1 is a vertical section of the tool. Fig. 2 is a side elevation thereof. Fig. 3 is a transverse section on line $x^3$—$x^3$ Fig. 1. Fig. 4 is a vertical section of the lower portion of the tool, showing a different form of gripping jaws therein.

The tool comprises a vertical tubular member 1 provided at its upper end with a shank 2 having a screw threaded portion 3 for attachment to the usual string for raising or lowering the fishing tool. The bore of said tubular member 1 is preferably flared or beveled outwardly at its lower end, as shown at 4, to enable it to slip readily over the part to be fished. Said bore is provided with an enlarged portion, indicated at 5, forming upper and lower shoulders 6, 6', and at one side of such enlarged portion the tubular member is provided with a vertical slot 7 in its wall serving as a guideway for the movable jaw member or slip, said slip being formed with a jaw 9 shaped to fit within the bore portion 5 and to slide therein, and having a plate 10 secured thereto by screws 11, said plate flaring outwardly and fitting in the slot 7 which is correspondingly flared so as to provide a dovetailed joint securing the slip on the tubular member, but enabling the slip to slide vertically in its guideway.

The gripping means further comprises a fixed jaw 13 having its outer face conformed to the inside of the tubular portion 5 and held against said face by a screw 14, said jaw preferably resting at its lower end on the shoulder 6 and being provided with a transverse rib 15 on its back which extends into a correspondingly shaped slot 17 in the wall of the tubular member 1 forming a seat to firmly support the said jaw 13 against the vertical stress involved in the gripping action. In the form of the invention shown in Fig. 1, the jaws 9 and 13 are convexly rounded on their inner faces and are provided with serrations or teeth 18, said teeth being pointed upwardly to effectually engage with the part to be finished in the operation of the tool. By means of the detachable connections 11 and 14 said jaw members 9 and 13 may be removed and other forms of jaw members substituted therefor, for example, the form shown in Fig. 4, wherein the movable jaw 19 and the fixed jaw 20 are each formed with upward and inwardly inclined faces so as to provide a sharp gripping edge at the upper end of each member.

The tubular member 1 is provided at one side with a slot 22, for the purpose hereinafter set forth.

The operation of the tool is as follows:—
The tubular member 1 is let down into the well by means of the usual supporting line or string of rods or the like and passes down over the part to be fished, the upper end of said part entering the flaring lower end 4 of the bore in the tubular member, and, engaging with the jaw 9 of the movable slip, forces said slip upwardly until sufficient distance is provided between the said jaws to slip down over and around the part to be fished, it being understood that in this operation the tubular member 1 and the part carried thereby will tilt somewhat so as to accommodate the jaws to the part to be fished and enable said part to slip between the jaws, as stated. On then pulling up on the tubular member 1, by means of its supporting string or line, the upwardly directed teeth 18 on the jaw members engage with the surface of the part to be fished so as to tend to pull the slip jaw 9 down relatively to the tubular member and bring said jaw nearer to the fixed jaw, and at the same time the pull on the tubular member tends to straighten the same into vertical position and thereby set the teeth of the jaws more firmly into the part to be fished, so as to take a tight grip thereon and enable said part to be lifted with the tubular member. When the part has been lifted out of the well in this manner it can be removed from the gripping jaws, the slot 22 at one side of the tubular member enabling ready access to said part to facilitate its removal, said slot extending from the top of the tubular member to a point below the top of the enlargement 5, and adjacent to the top of the fixed jaw member 13, so that the tool and jaws are readily accessible through this slot.

What I claim is:—

1. A fishing tool comprising a tubular supporting member open at top and bottom, the bore of said tubular member having an enlarged portion near the lower end thereof, a fixed jaw within said enlarged portion of the tubular member at one side thereof, the other side of said tubular member having a vertical slot extending from the enlarged bore portion thereof to the outside of the tubular member, said slot having outwardly flaring walls, an outwardly flaring plate mounted in said slot to slide vertically therein and a movable jaw detachably secured to said plate and extending at each side of the plate to engage the inside of the enlarged bore portion of the tubular member, said plate engaging the walls of the slot to hold said jaw against the inside of the tubular member, and said fixed and movable jaws having grip portions projecting within the bore of the tubular member.

2. A fishing tool comprising a tubular supporting member open at top and bottom, the bore of said tubular member having an enlarged portion near the lower end thereof, forming a shoulder at the lower end of said enlarged portion, a fixed jaw within said enlarged bore portion of the tubular member, the lower end of said fixed jaw engaging said shoulder, a screw rigidly connecting said fixed jaw to said tubular supporting member to detachably hold the fixed jaw in position, said tubular supporting member having a slot back of the fixed jaw and said fixed jaw having a lug fitting in said slot and a movable jaw slidably mounted at the other side of the enlarged bore portion of the tubular member, said fixed and movable jaws being provided with grip portions projecting within the bore of the tubular member.

In testimony whereof I have hereunto set my hand at Los Angeles, California, this 7th day of May 1910.

CHARLES DANIEL.

In presence of—
 ARTHUR P. KNIGHT,
 FRANK L. A. GRAHAM.

---

Copies of this patent may be obtained for five cents each, by addressing the "Commissioner of Patents, Washington, D. C."